United States Patent
Tateishi (10) Patent No.: US 6,469,481 B1
(45) Date of Patent: Oct. 22, 2002

(54) PARALLEL RC CURRENT DETECTION CIRCUIT AND DC/DC CONVERTER WITH A PARALLEL RC CURRENT DETECTION CIRCUIT

(75) Inventor: Tetsuo Tateishi, Aichi (JP)

(73) Assignee: Kabushiki Kaisha Toyoda Jidoshokki Seisakusho (JP)

( * ) Notice: Subject to any disclaimer, the term of this patent is extended or adjusted under 35 U.S.C. 154(b) by 0 days.

(21) Appl. No.: 09/457,540

(22) Filed: Dec. 9, 1999

(30) Foreign Application Priority Data

Dec. 25, 1998  (JP) .............................................. 10-370738

(51) Int. Cl.⁷ ................................................. G05F 1/40
(52) U.S. Cl. ......................................... 323/282; 323/285
(58) Field of Search ................................. 323/282, 285, 323/287, 351

(56) References Cited

U.S. PATENT DOCUMENTS

| | | | |
|---|---|---|---|
| 4,428,015 A | * | 1/1984 | Nesler .......................... 361/18 |
| 4,668,905 A | | 5/1987 | Schierjott .................... 323/287 |
| 4,929,882 A | * | 5/1990 | Szepesi ....................... 323/222 |
| 4,967,138 A | | 10/1990 | Obergfell et al. ........... 323/224 |
| 5,180,964 A | * | 1/1993 | Ewing ......................... 323/222 |
| 5,481,178 A | | 1/1996 | Wilcox et al. .............. 323/287 |
| 5,847,554 A | | 12/1998 | Wilcox et al. .............. 323/282 |
| 5,949,229 A | * | 9/1999 | Choi et al. .................. 323/320 |
| 5,982,160 A | * | 11/1999 | Walters et al. .............. 323/282 |
| 6,025,705 A | * | 2/2000 | Nguyen et al. ............. 323/282 |

FOREIGN PATENT DOCUMENTS

JP         08030341 A       2/1996

* cited by examiner

*Primary Examiner*—Adolf Denske Berhane (57) ABSTRACT

An RC series circuit is provided in parallel with an inductor. The RC series circuit is comprised of a resistor and a capacitor which are connected with each other in series. A voltage across the capacitor is applied to a detection circuit. The detection circuit detects inductor current flowing through the inductor based on the applied voltage. If the inductance of the inductor, the parasitic resistance value of the inductor, the capacitance of the capacitor and the resistance value of the resistor are L, RL, $C_a$ and $R_a$, respectively, the RC series circuit is designed so as to satisfy $L/RL = C_a * R_a$.

5 Claims, 12 Drawing Sheets

PARALLEL RC CURRENT DETECTION CIRCUIT AND DC/DC CONVERTER WITH A PARALLEL RC CURRENT DETECTION CIRCUIT

BACKGROUND OF THE INVENTION

1. Field of the Invention

The present invention relates to a circuit for detecting current flowing through an inductor.

2. Description of the Related Art

Inductors are used for various purposes as one fundamental element composing an electric circuit. For example, in a general DC/DC converter (switching regulator), an inductor is provided between a switching element and an output terminal, and is used to store energy.

Figure 1:
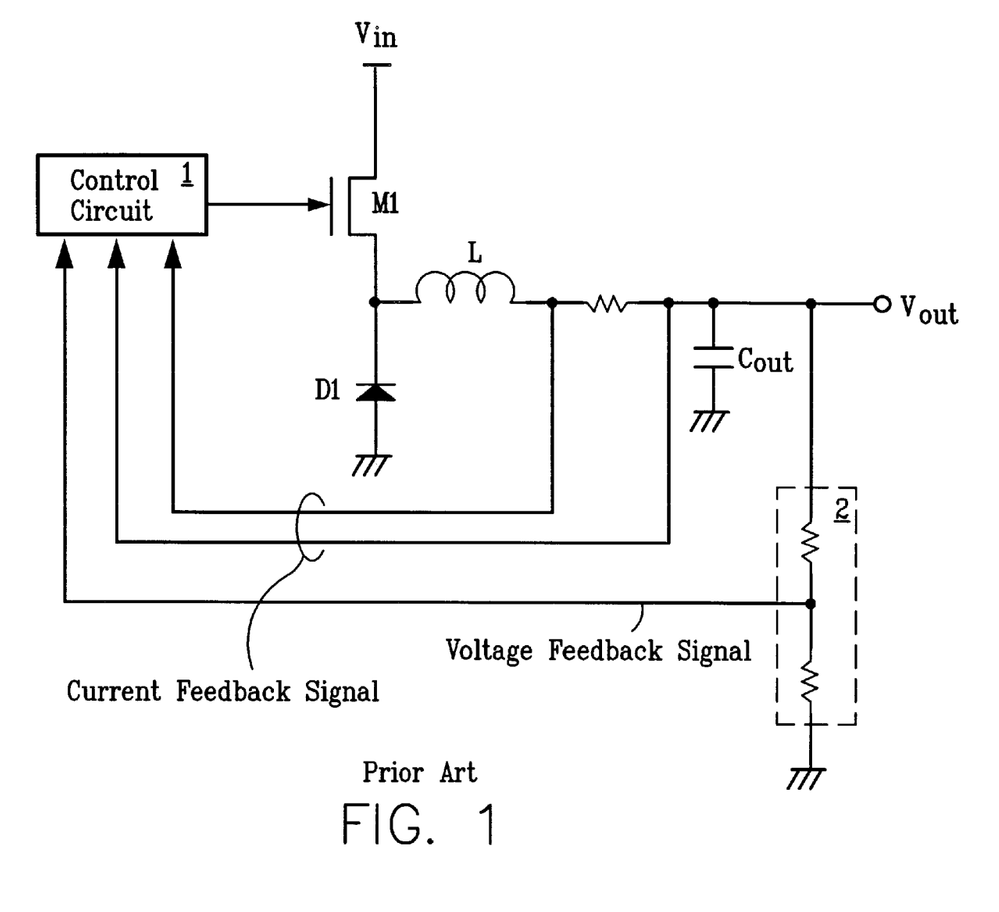
FIG. 1 shows a conventional step-down type current mode DC/DC converter.

FIG. 1 shows a conventional step-down type current mode DC/DC converter. This DC/DC converter generates output voltage $V_{out}$ from input voltage $V_{in}$ and regulates the output $V_{out}$.

Input voltage $V_{in}$ is applied to switch M1, and switch M1 is turned on or off according to a control signal provided from a control circuit 1. A cathode of Diode D1 is connected to switch M1. Diode D1 operates as a rectification element. Inductor L is provided between switch M1 and the output terminal. Sense resistor $R_s$ is connected to inductor L in series and is used as a shunt resistor. Output capacitor $C_{out}$ smoothes the current to be supplied to a load. A voltage dividing circuit 2 divides output $V_{out}$ at a prescribed rate.

The control circuit 1 generates a control signal for controlling switch M1 so as to maintain output $V_{out}$ at a specific level, based on a voltage feedback signal and a current feedback signal. Here, the voltage feedback signal indicates output $V_{out}$ and is obtained from the voltage dividing circuit 2. The current feedback signal indicates current flowing through inductor L (hereinafter called "inductor current") and the voltage across sense resistor $R_s$ is used for the signal.

In this way, some DC/DC converters with an inductor detect output voltage or inductor current, and control a switch based on the detected value. In a conventional converter, as shown in FIG. 1, a resistor for detecting current (sense resistor $R_s$) was provided in series with the inductor, and the inductor current was detected based on the voltage across the resistor.

However, since a sense resistor is provided in series with the inductor, a voltage drop occurs. Thus, electric power is wasted. That is to say, if a sensor resistor is provided, the efficiency of the DC/DC converter deteriorates. In particular, since the output voltage of the DC/DC converter decreases as the voltage required by a load (for example, a CPU of a personal computer) decreases, a ratio of the voltage drop in the sense resistor to the output voltage of the DC/DC converter relatively increases. Therefore, loss in the sense resistor becomes a major cause preventing the efficiency of the DC/DC converter from being improved.

In addition, the sense resistor must have a small resistance value, have a wide temperature range under which it can be used, and have an accurate resistance value. As a result, cost of the sense resistor will be comparatively high.

This problem occurs not only in the DC/DC converter, but it also occurs when detecting current flowing through an inductor.

SUMMARY OF THE INVENTION

The objective of the present invention is to provide a circuit for detecting, with small loss, current flowing through an inductor.

The current detection circuit of the present invention detects current flowing through an inductor, and comprises a first circuit and a second circuit. The first circuit includes a resistor and a capacitor which are connected with each other in series, and is provided in parallel with the inductor. The second circuit detects current flowing through the inductor based on the voltage across the capacitor. A value obtained by multiplying the capacitance of a capacitor by the resistance value of the resistor is determined based on a ratio of the inductance of the inductor to the parasitic resistance value of the inductor. For example, if the inductance of the inductor, the parasitic resistance value of the inductor, the capacitance of the capacitor and the resistance value of the resistor are L, RL, $C_a$ and $R_a$, respectively, the first circuit is designed in such a way that $L/RL = C_a \cdot R_a$ is satisfied. Alternatively, the circuit constant of the first circuit is determined in such a way that the transfer function of voltage against current flowing through the inductor equals the transfer function of a capacitor voltage against current flowing in the first circuit.

In the above described circuit, the voltage across the capacitor equals the voltage across the parasitic resistance of the inductor. The voltage across the parasitic resistance of the inductor is a voltage drop generated by current flowing through the inductor. Therefore, if the parasitic resistance value of the inductor is known, current flowing through the inductor can be detected by monitoring the voltage across the capacitor. In particular, since a differential equation relating to the voltage across the parasitic resistance of the inductor equals the differential equation relating to the voltage across the capacitor under the condition that $L/RL = C_a \cdot R_a$ is satisfied, the voltage across the capacitor always indicates the inductor current.

DESCRIPTION OF THE PREFERRED EMBODIMENTS

Figure 2:
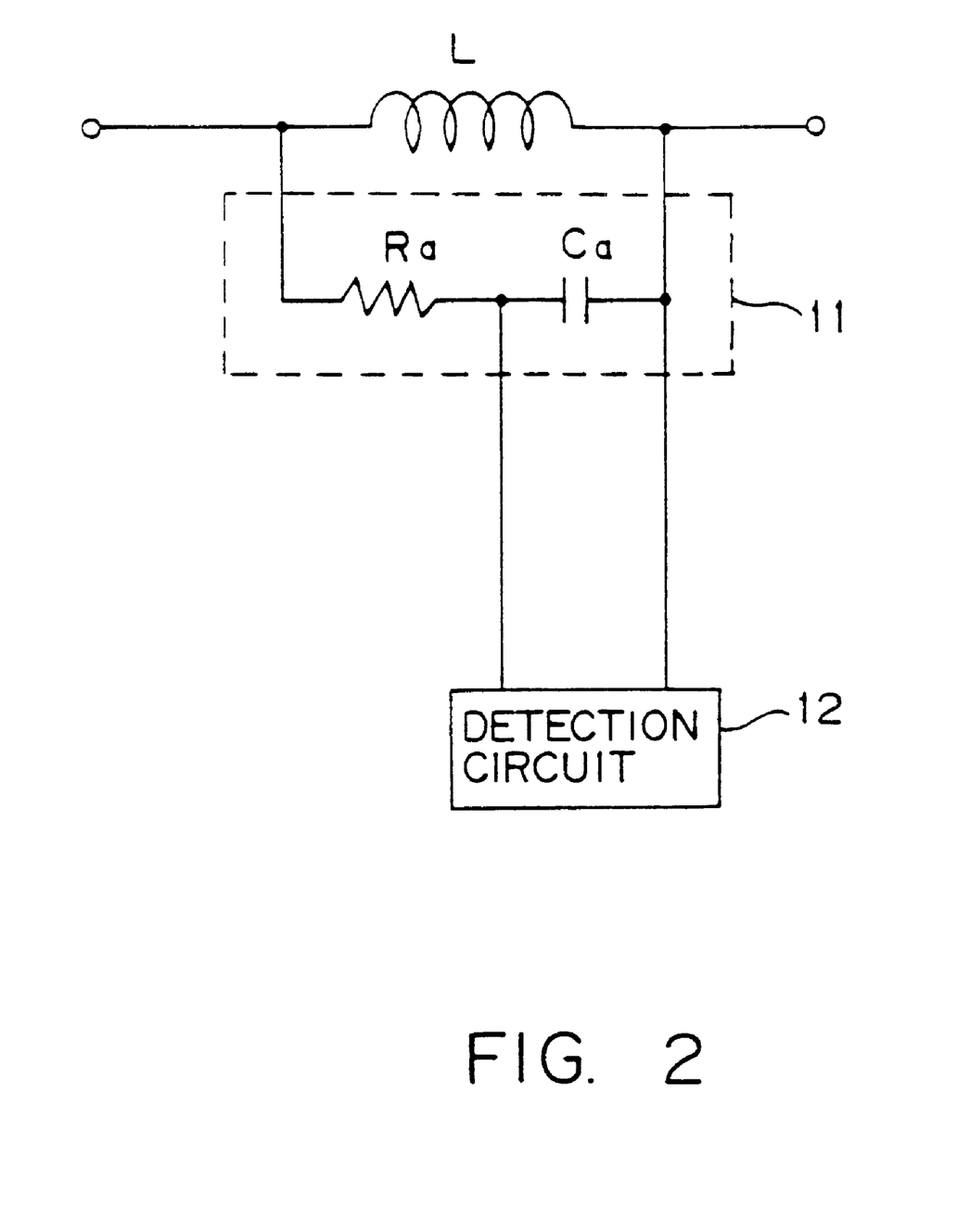
FIG. 2 shows the current detection circuit of the present invention.

The preferred embodiments of the present invention are described below with reference to the drawings. FIG. 2 shows the current detection circuit of the present invention. The current detection circuit of the present invention comprises an RC series circuit 11 and a detection circuit 12, and detects current flowing through the inductor L (this current is referred to "inductor current").

The RC series circuit 11 is comprised of a resistor $R_a$ and a capacitor $C_a$ which are connected with each other in series. This RC series circuit 11 is connected in parallel with inductor L. A voltage across capacitor $C_a$ is applied to the detection circuit 12, and it detects inductor current based on the applied voltage. The reason why inductor current is detected based on the voltage across capacitor $C_a$, is described referring to FIG. 3.

Figure 3:
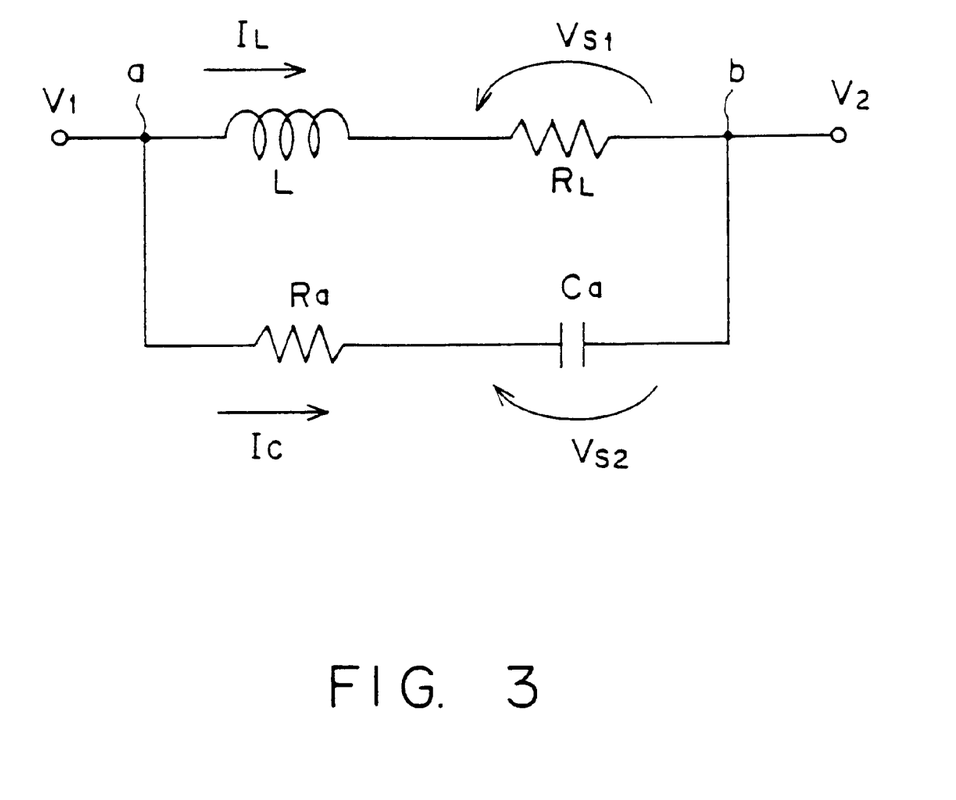
FIG. 3 is a drawing showing the principle of the present invention.

FIG. 3 is a drawing showing the principle of the present invention. In FIG. 3, resistance RL is the resistance factor of inductor L, and is obtained, for example, by measuring the DC (direct current) resistance of inductor L. In the following description, this resistance factor is called "parasitic resistance".

In this way, inductor L shown in FIG. 2 is expressed as a circuit in which an inductor L whose resistance value is 0 and a resistor whose resistance value is RL, are connected in series. In this case, in the circuit shown in FIG. 3, the following equations are obtained.

$$V_{s1(t)} = I_{L(t)} \cdot R_L \quad (1)$$

$$L \cdot \frac{d}{dt} I_{L(t)} + V_{s1(t)} = V_{1(t)} - V_{2(t)} \quad (2)$$

$$C_a \cdot \frac{d}{dt} V_{s2(t)} = I_{c(t)} \quad (3)$$

$$V_{s2(t)} + I_{c(t)} \cdot R_a = V_{1(t)} - V_{2(t)} \quad (4)$$

Equation (1) indicates the voltage across resistor RL (that is, the voltage drop across resistor RL). Here, IL is inductor current. Equation (2) indicates the potential difference between point a and point b. In this equation, V1 and V2 are the potential at point a and the potential at point b, respectively. Equation (3) indicates current flowing through resistor $R_a$. Equation (4) indicates the voltage applied to the RC series circuit 11.

Equation (5) is obtained from equations (1) and (2). Equation (6) is obtained from equations (3) and (4).

In a case where the following equation (7) is $$L \cdot \frac{d}{dt} \cdot \frac{V_{s1(t)}}{R_L} + V_{s1(t)} = V_{1(t)} - V_{2(t)} \quad (5)$$

$$\therefore \frac{d}{dt} V_{s1(t)} = (V_{1(t)} - V_{2(t)} - V_{s1(t)}) \frac{R_L}{L}$$

$$\frac{d}{dt} V_{s2(t)} = (V_{1(t)} - V_{2(t)} - V_{s3(t)}) \frac{1}{C_a \cdot R_a} \quad (6)$$

true in equations (5) and (6), a differential equation relating to voltage $V_{s1}$ equals a differential equation relating to voltage $V_{s2}$.

$$\frac{L}{R_L} = C_a \cdot R_a = K \quad (7)$$

If the differential equation relating to voltage $V_{s1}$ equals the differential equation relating to voltage $V_{s2}$ under a condition that the initial values of them are the same, voltage $V_{s1}$ and voltage $V_{s2}$ are always equal. Specifically, in the circuit shown in FIG. 3, if the initial state of the voltage across resistor RL equals the initial state of capacitor $C_a$, the voltage across capacitor $C_a$ always follows the voltage across resistor RL. Therefore, the voltage across resistor RL can be detected by detecting the voltage across capacitor $C_a$.

If the resistance value of resistor RL is known, the inductor current can be obtained by detecting the voltage across resistor RL, since the voltage across resistor RL is a voltage drop caused by the inductor current. Specifically, in the circuit shown in FIG. 3, the inductor current can be obtained by detecting the voltage across capacitor $C_a$.

Figure 4:
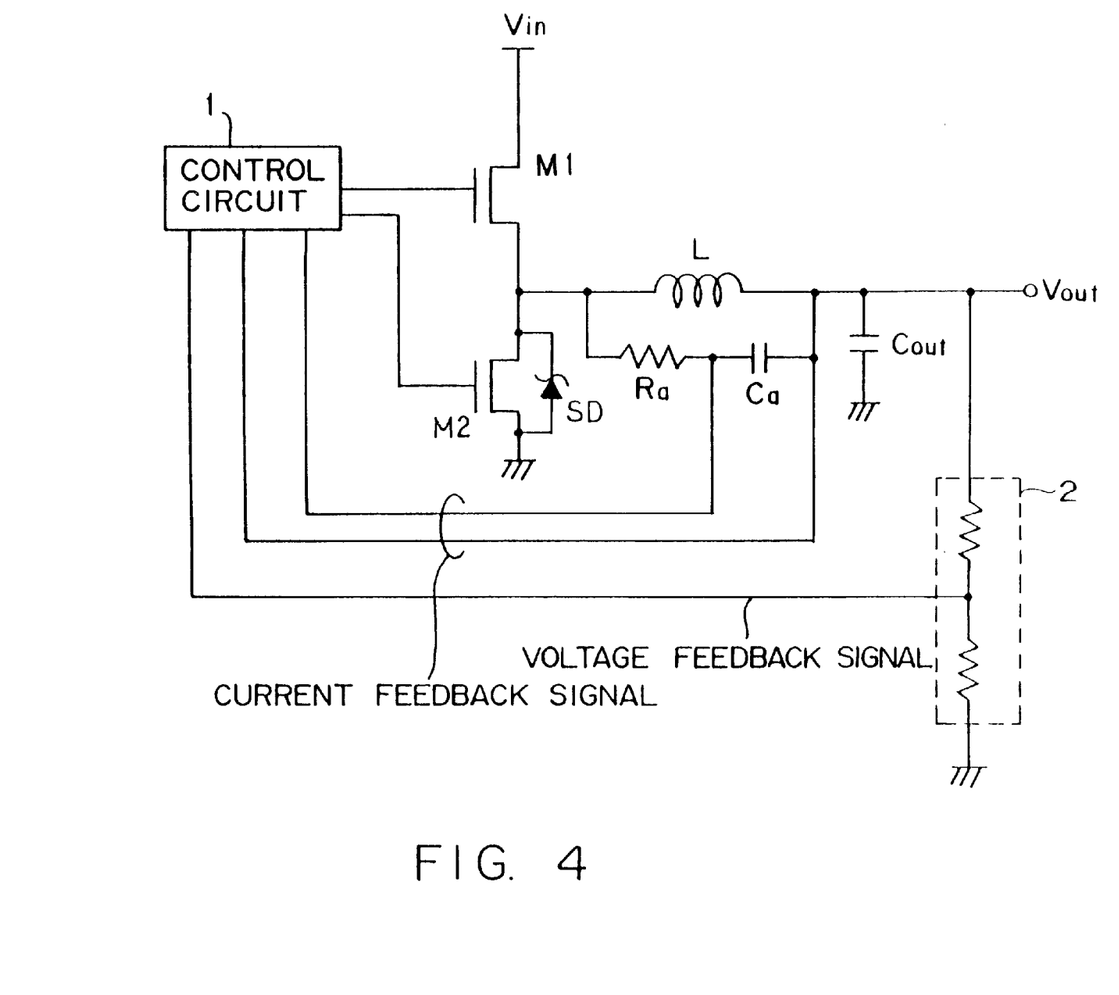
FIG. 4 shows a DC/DC converter with the current detection circuit of the present invention.

FIG. 4 shows a DC/DC converter with the current detection circuit shown in FIG. 3. Here, the detection circuit 12 is not shown, but it is provided in the control circuit.

In the initial state of the DC/DC converter (that is to say, the stop state of the DC/DC converter), the voltage across inductor L is 0. Thus, voltage $V_{s1}$ and voltage $V_{s2}$ shown in FIG. 3 are both 0 in the initial state of this DC/DC converter. Therefore, if both the resistance value of resistor $R_a$ and the capacitance of capacitor $C_a$ are determined so as to satisfy equation (7), the control circuit 1 can detect the inductor current by detecting the voltage across capacitor $C_a$.

Although it is assumed in the above description that the initial values of voltage $V_{s1}$ and voltage $V_{s2}$ are the same, the initial values of voltage $V_{s1}$ and voltage $V_{s2}$ actually often differ each other. It was mathematically proved that voltage $V_{s1}$ and voltage $V_{s2}$ are always equal, if the initial values of voltage $V_{s1}$ and voltage $V_{s2}$ are the same. However, even if the initial values of voltage $V_{s1}$ and voltage $V_{s2}$ are the same, voltage $V_{s1}$ and voltage $V_{s2}$ actually often differ due to external factors. For example, in a DC/DC converter, voltage $V_{s1}$ and voltage $V_{s2}$ often differ instantaneously due to switching noise and so on.

The error between voltage $V_{s1}$ and voltage $V_{s2}$ is described below. Since this error is considered to change as time elapses, the error is expressed using equation (8).

$$E(t) = V_{s1}(t) - V_{s2}(t) \quad (8)$$

If equation (8) is differentiated using time, equation (9) is obtained.

$$\frac{d}{dt} E(t) = \frac{d}{dt} (V_{s1(t)} - V_{s2(t)}) \quad (9)$$

$$= \frac{d}{dt} V_{s1(t)} - \frac{d}{dt} V_{s2(t)}$$

If equations (5), (6) and (7) are assigned in equation (9), equation (10) is obtained.

$$\frac{d}{dt} E(t) = \frac{1}{K} (V_{1(t)} - V_{2(t)} - V_{s1(t)}) \quad (10)$$

$$- \frac{1}{K} (V_{1(t)} - V_{2(t)} - V_{s2(t)})$$

$$= -\frac{1}{K} (V_{s1(t)} - V_{s2(t)})$$

Furthermore, equation (11) is obtained from equations (8) and (10).

$$\frac{d}{dt} E(t) = -\frac{1}{K} \cdot E(t) \quad (11)$$

Therefore, equation (12) is obtained by solving a differential equation expressed by equation (11). Provided that C1 is an integration constant.

$$E(t) = C_1 \cdot e^{-\frac{t}{k}} \quad (12)$$

Equation (12) indicates that a difference (error E(t)) between voltage $V_{s1}$ and voltage $V_{s2}$ decreases as time elapses according to time constant k. Specifically, equation (12) indicates that even if voltage $V_{s1}$ and voltage $V_{s2}$ temporarily differ, the difference between voltage $V_{s1}$ and voltage $V_{s2}$ decreases as time elapses, and eventually voltage $V_{s2}$ will become equal to voltage $V_{s1}$. In other words, a system in which the voltage across the parasitic resistance of the inductor is estimated using the voltage across capacitor $C_a$, is stable. Thus, the same voltage as voltage across the parasitic resistance of inductor L is obtained in capacitor $C_a$, and thereby the inductor current can be detected by detecting the voltage across capacitor $C_a$.

In the present invention, it is important to satisfy equation (7). The importance in satisfying equation (7) is described below.

As shown in FIGS. 2 and 3, the current detection circuit of the present invention is provided with an RC series circuit 11 in parallel with an inductor, and the inductor current can be detected by detecting the voltage across capacitor $C_a$ of the RC series circuit 11. The RC series circuit 11 averages (integrates) the voltage across the inductor. Therefore, even if equation (7) is not satisfied, the current detection circuit of the present invention can detect the average value (DC factor) of the inductor current.

However, it is often requested to detect not the average value of the inductor current but the inductor current itself which changes as time elapses. For example, in a current mode DC/DC converter, a switch is controlled based on the inductor current which changes as time elapses.

In the current detection circuit of the present invention, the resistance value of resistor $R_a$ and capacitance of capacitor $C_a$ composing the RC series circuit 11 are determined in such a way that equation (7) is satisfied in order to meet the above request. In equations (5) and (6), V1(t) and V2(t) are not mathematically limited to specific functions. Thus, equations (5) and (6) hold true no matter what functions V1(t) and V2(t) are. Then, if the RC series circuit 11 is designed so as to satisfy equation (7), a differential equation relating to voltage $V_{s1}$ (voltage across the parasitic resistance of an inductor) equals a differential equation relating to voltage $V_{s2}$ (voltage across capacitor $C_a$). Therefore, the voltage across capacitor $C_a$ is always in accordance with the voltage across the parasitic resistance of the inductor regardless of the change in the voltage across the inductor (V1(t) and V2(t)). Specifically, the inductor current can always be detected as the voltage across capacitor $C_a$.

In this way, since the RC series circuit 11 is designed so as to satisfy equation (7), not only the average value of inductor current but the inductor current itself which changes as time elapses can be detected without a sense resistor connected in series with the inductor. The applicant of this claimed invention has confirmed by experiment that the inductor current can be accurately detected by using the voltage across capacitor $C_a$ in the cases both where the inductor current is DC and where the inductor current includes AC factor.

In the present invention, it is not necessary for equation (7) to be strictly satisfied, and it is sufficient for equation (7) to be substantially satisfied. The fact that "equation (7) is substantially satisfied" includes, for example, the fact that the production dispersion of the circuit elements and measurement error of a resistance value, capacitance and inductance are ignored.

In this way, according to the current detection circuit of the present invention, since the inductor current can be detected without a sense resistor connected in series with an inductor, the electric power consumption is reduced. In addition, since the RC series circuit is composed of inexpensive resistor and capacitor, the cost of the current detection circuit is reduced.

If the parasitic resistance of the inductor is small, the voltage across the parasitic resistance (voltage $V_{s1}$ shown in FIG. 3) is also small, and thereby the voltage across capacitor $C_a$ (voltage $V_{s2}$ shown in FIG. 3) is also small. Here, if the voltage across capacitor $C_a$ is small, it inevitably becomes difficult to accurately detect the voltage value because of noises and so on. Therefore, if the parasitic resistance of the inductor is small, the current detection circuit of the present invention may not detect the inductor current accurately.

Figure 5A:
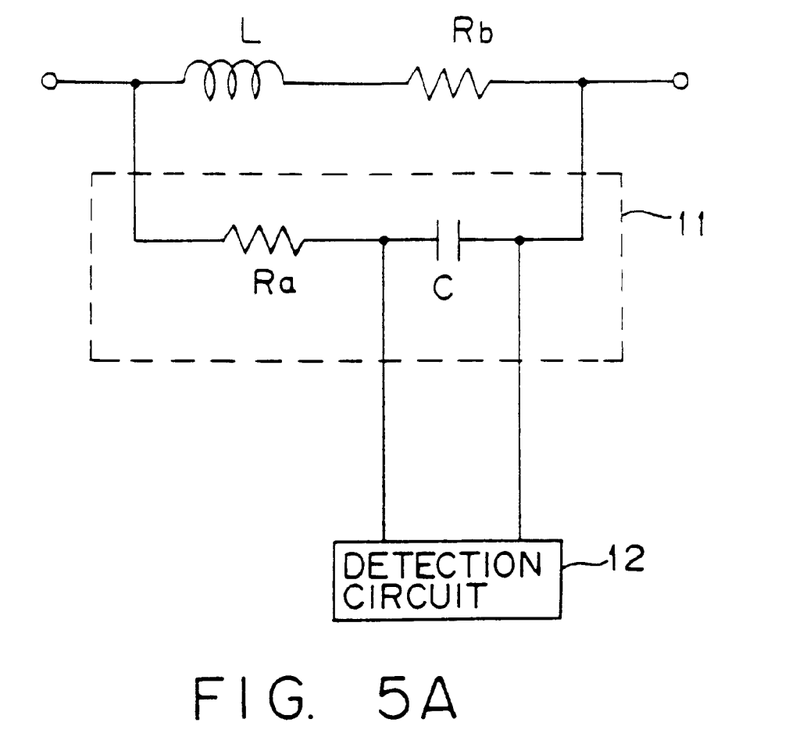
FIG. 5A shows the current detection circuit of another preferred embodiment of the present invention.
Figure 5B:
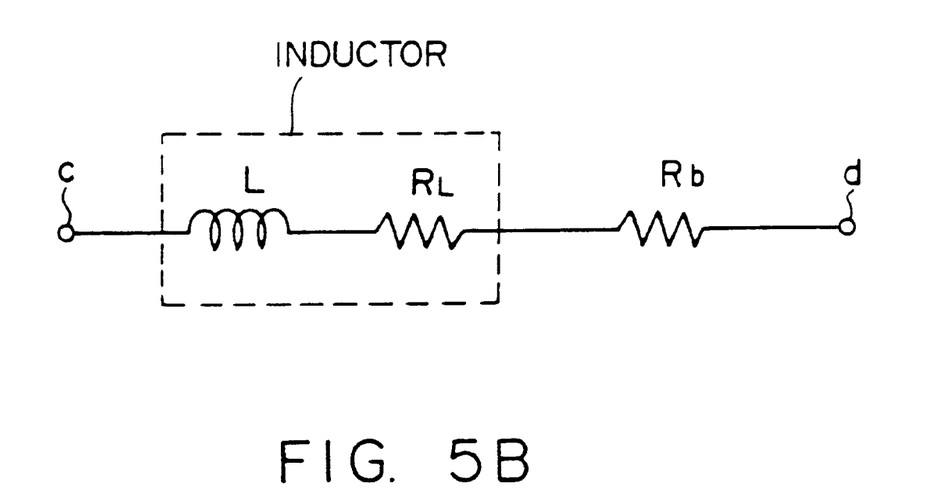
FIG. 5B is a drawing showing the operation of the circuit shown in FIG. 5A.

FIG. 5A shows another preferred embodiment of the present invention. In this circuit, an auxiliary resistor $R_b$ is connected in series with the inductor in such a way that the voltage across capacitor $C_a$ is sufficiently large even if the parasitic resistance of the inductor is small. The RC series circuit 11 is provided in parallel with the inductor and auxiliary resistor $R_b$ which are connected with each other in series. As described above, the inductor has parasitic resistance RL. Therefore, the DC resistance factor of the inductor and auxiliary resistor $R_b$ which are connected with each other in series becomes $RL+R_b$, as shown in FIG. 5B.

The resistance value of resistor $R_a$ and the capacitance of capacitor $C_a$ are determined based on the inductance L of an inductor and this DC resistance factor. Specifically, for example, the resistance value of resistor $R_a$ and the capacitance of capacitor $C_a$ are determined so as to satisfy equation (13).

$$\frac{L}{R_L + R_b} = C_a \cdot R_a \quad (13)$$

Figure 6A:
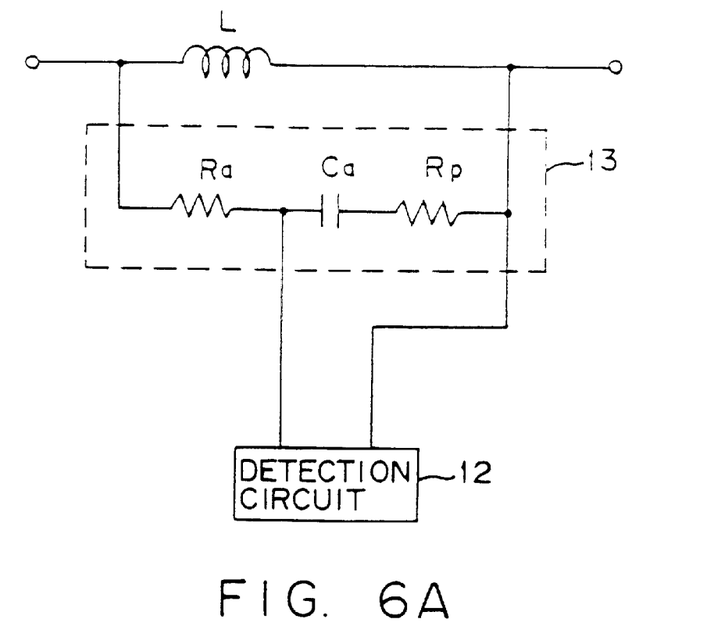
FIGS. 6A and 6B show the current detection circuits of another preferred embodiment of the present invention.

FIG. 6A shows the current detection circuit of another preferred embodiment of the present invention. In this circuit, an RC series circuit 13 is provided with an auxiliary resistor $R_p$ comparing with the RC series circuit 11 shown in FIG. 2. Specifically, the RC series circuit 13 is comprised of a resistor $R_a$, capacitor $C_a$ and an auxiliary resistor $R_p$ which are connected with each other in series, and is provided in parallel with inductor L. The voltage across the capacitor $C_a$ and the auxiliary resistor $R_p$ is applied to the detection circuit 12.

In this case, a sum of the voltage which directly indicates the inductor current and offset voltage equivalent to the voltage drop across the auxiliary resistor $R_p$ is applied to the detection circuit 12, in place of the voltage which directly indicates the inductor current.

Figure 7:
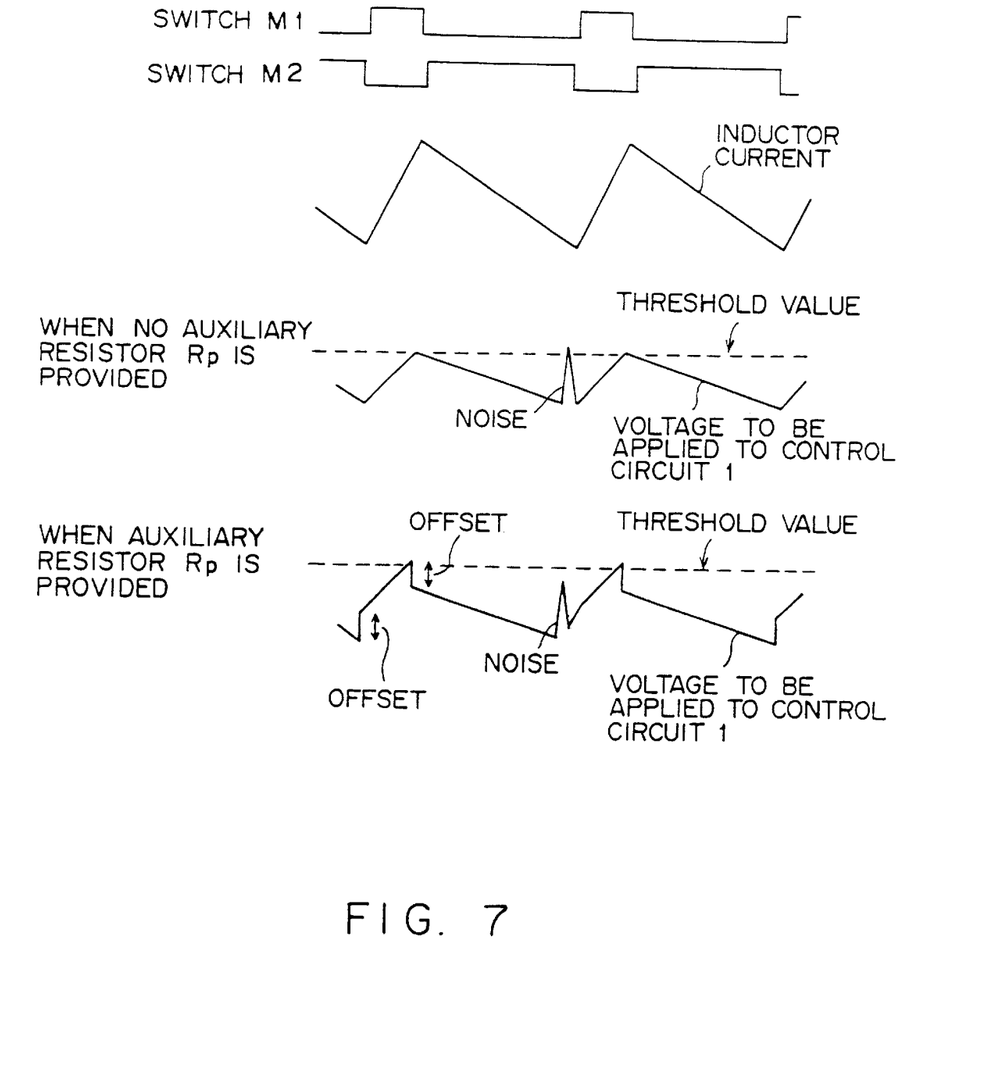
FIG. 7 shows the operations of DC/DC converter with the circuit shown in FIGS. 6A or 6B.

The current detection circuit shown in FIG. 6A is applied to a current mode type DC/DC converter as shown in FIG. 4. In this DC/DC converter, switches M1 and M2 are basically turned on/off alternately according to a control signal from the control circuit 1. As shown in FIG. 7, while switches M1 and M2 are ON and OFF, respectively, the inductor current linearly increases, and while switches M1 and M2 are OFF and ON, respectively, the inductor current linearly decreases. If auxiliary resistance $R_p$ is not provided, the voltage applied to the control circuit 1 indicates the same waveform as that of the inductor current.

The control circuit 1 compares the applied voltage with a threshold value. If this applied voltage is higher than the threshold value, the control circuit 1 changes the states of switches M1 and M2. This threshold value is generated, for example, based on output voltage $V_{out}$. However, since there is a parasitic capacitor in an inductor, a noise, such as a spike noise at switching timing, etc., is generated. If the noise is added to a voltage signal to be transmitted to the control circuit 1, the voltage to be applied to the control circuit 1 may exceed the threshold at improper timing, as shown in FIG. 7. In this case, the switches M1 and M2 of the DC/DC converter perform wrong operation.

However, if auxiliary resistor $R_p$ is provided, as shown in FIG. 6A, offset voltage is added to the voltage to be applied to the control circuit 1. For this reason, even if the noise is added to the voltage signal to be transmitted to the control circuit 1, as shown in FIG. 7, the voltage to be applied to the control circuit 1 is prevented from exceeding the threshold value at an improper timing, and the wrong operation of switches M1 and M2 is avoided. The offset voltage can be adjusted, for example, by the resistance value of auxiliary resistor $R_p$.

Figure 6B:
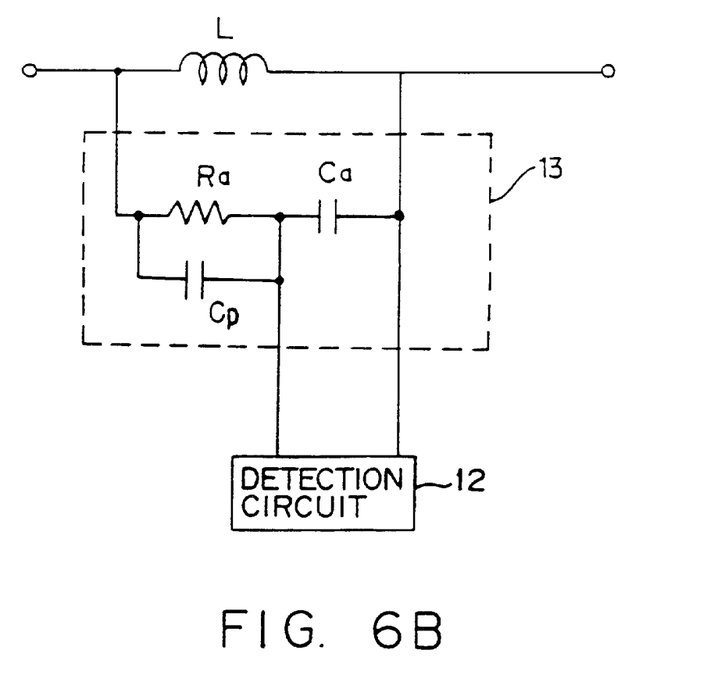

FIG. 6B shows the RC series circuit using auxiliary capacitor $C_p$ instead of auxiliary resistor $R_p$. According to this circuit, considerable amount of offset voltage can be generated by the capacitance of capacitor $C_p$, thereby the same effect as in the configuration shown in FIG. 6A can be obtained.

Although in the above-described preferred embodiments it is presumed that equation (7) is satisfied, the current detection circuit can also be designed without satisfying equation (7) depending on the use. These preferred embodiments are described below.

Figure 8:
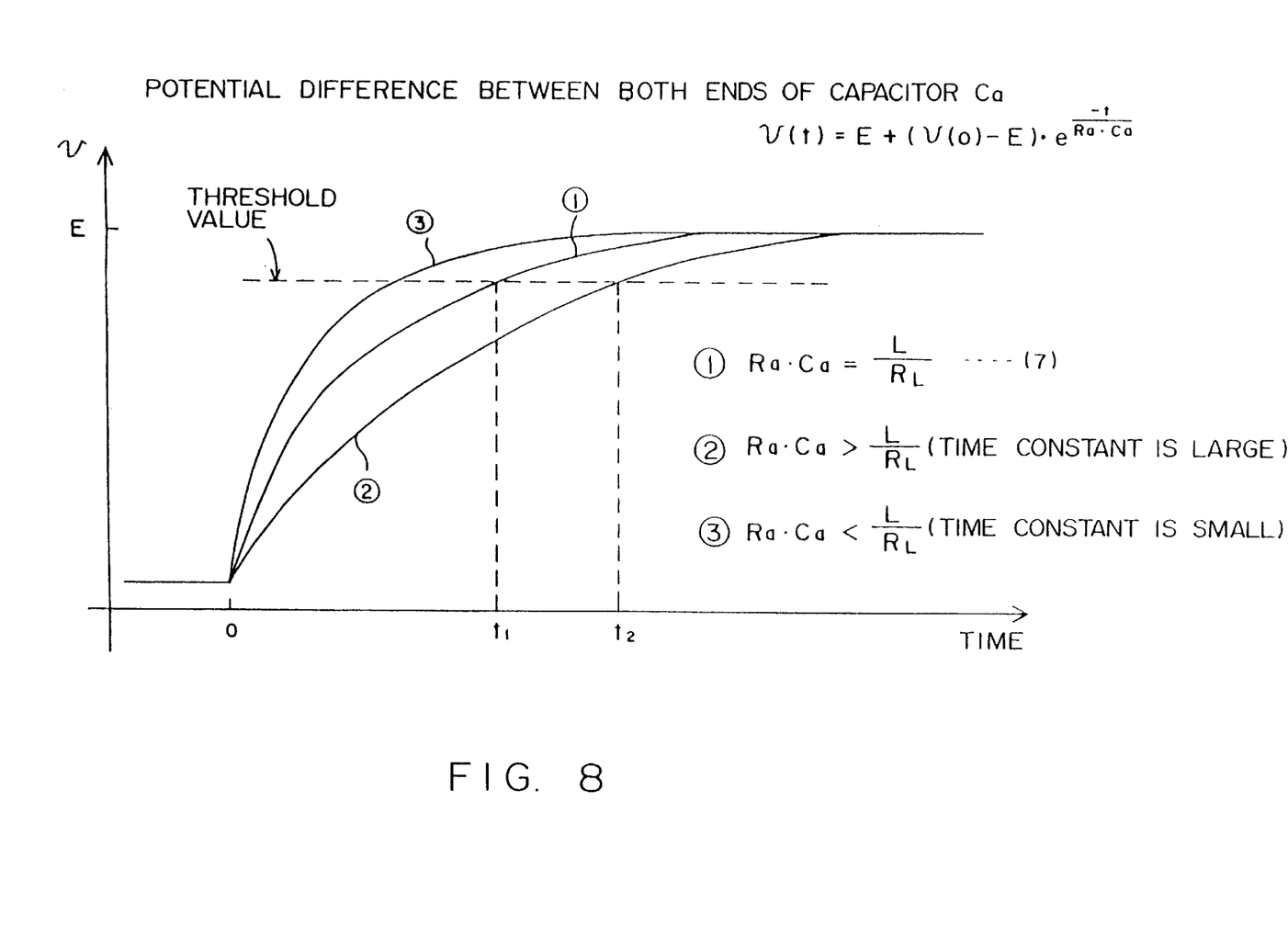
FIG. 8 shows a transient response characteristic.

The current detection circuit of the present invention detects inductor current based on the voltage across capacitor $C_a$ in the RC series circuit 11. As shown in FIG. 8, the voltage across capacitor $C_a$ is expressed with a function which changes according to time constant k (k=$R_a \cdot C_a$). Specifically, if time constant k is large, the voltage across capacitor $C_a$ changes slowly, and if time constant k is small, the voltage changes rapidly.

Here, a detection of over current is described. In this case, the voltage across capacitor $C_a$ which indicates the inductor current is compared with an over current threshold. If the RC series circuit 11 is designed so as to satisfy equation (7), the voltage across capacitor $C_a$ exceeds the threshold value at time t1. However, if time constant k is large, the voltage across capacitor $C_a$ reaches the threshold value at a time (time t2) later than time t1.

For example, the transient response characteristic of a DC/DC converter with an overcurrent protection function can be adjusted using time constant k. An overcurrent protection function, for example, compulsorily stops current or reduces the amount of current when overcurrent is detected.

The current detection circuit of the present invention is used in a DC/DC converter with an overcurrent detection function, and the time constant k of the RC series circuit 11 is set to a large value. In this case, even if the inductor current instantaneously exceeds the threshold value, the voltage across capacitor $C_a$ changes slowly. Therefore, if the inductor current becomes smaller than the threshold value before the voltage across capacitor $C_a$ reaches a value which indicates the overcurrent, the overcurrent protection operation is not performed. Thus the instantaneous overcurrent does not lead to the overcurrent protection operation.

Generally, a DC/DC converter is not destroyed by instantaneous overcurrent and is destroyed by heat generated when the overcurrent state continues beyond a prescribed time. Here, if the RC series circuit 11 is designed in such a way that the time constant k is large, the control circuit does not detect overcurrent when large current instantaneously flows. Specifically, if time constant k is large, instantaneous overcurrent which does not destroy the DC/DC converter is ignored. As a result, an event in which inductor current is compulsorily stopped (and the output voltage is dropped) by instantaneous overcurrent is avoided.

After a considerable amount of time elapses, the voltage across capacitor $C_a$ is stable (in the example shown in FIG. 8, v(t)=E) regardless of the time constant k, as shown in FIG. 8. Therefore, if the inductor current continuously exceeds the threshold, overcurrent is detected regardless of the value of time constant k.

When the transient response characteristic of the DC/DC converter is adjusted as described above, for example, an RC series circuit is designed so as to satisfy equation (14).

$$\frac{L}{R_L} < R_a \cdot C_a < \frac{10L}{R_L} \qquad (14)$$

If time constant k is small, the voltage across capacitor $C_a$ changes more rapidly than the change of inductor current. For this reason, if the overcurrent is monitored by using the voltage across capacitor $C_a$ with the small time constant k, during transient response period, the voltage across capacitor $C_a$ sometimes reaches the threshold value before the inductor current actually does not reach the threshold value. Specifically, a state as if the threshold value were reduced is obtained during a transient response period. Therefore, increase speed of the inductor current can be regulated to a prescribed level according to the time constant k.

If a transient response characteristic of the DC/DC converter is adjusted as described above, for example, an RC series circuit is designed so as to satisfy equation (15).

$$\frac{L}{R_L} > R_a \cdot C_a > \frac{L}{10R_L} \qquad (15)$$

The current detection circuit of the present invention detects inductor current not only when the inductor current is DC, but also when the inductor current changes as time elapses, by designing the RC series circuit so as to satisfy equation (7). However, if only the AC factor of the inductor current is to be detect, equation (7) does not to be satisfied.

Figure 9:
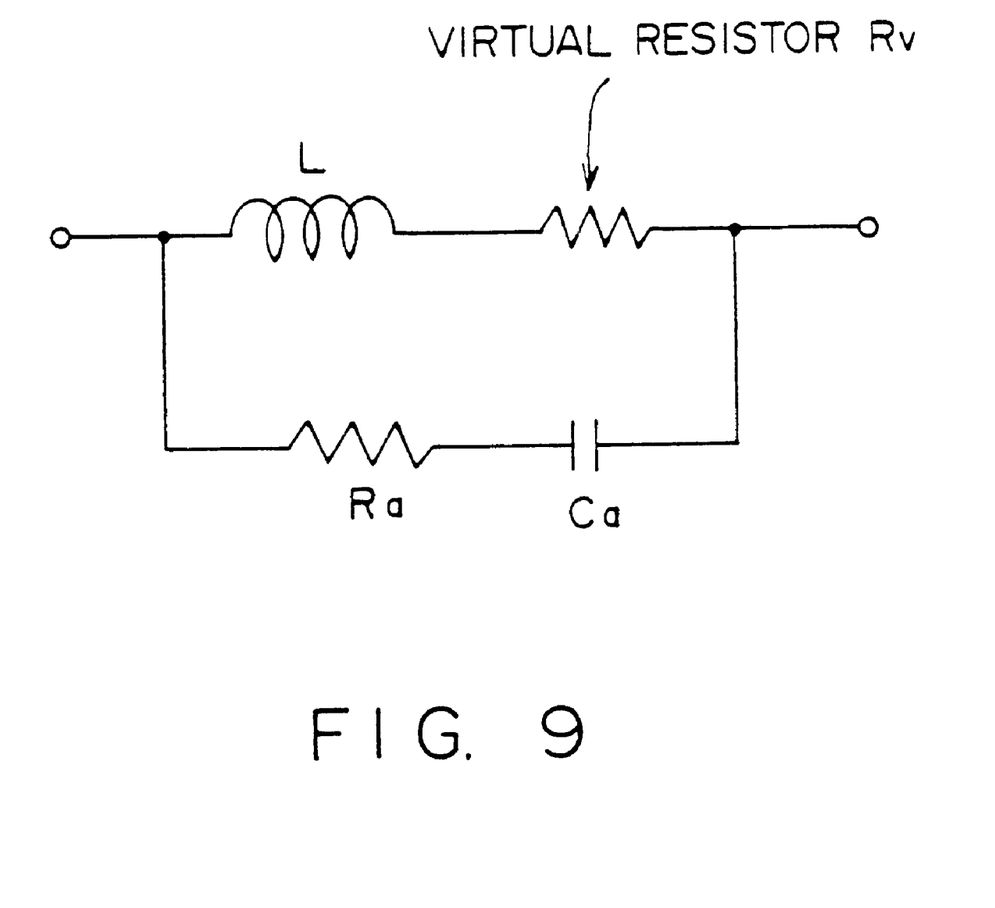
FIG. 9 shows an alternative design method of an RC series circuit.

For example, the RC series circuit is designed assuming that a virtual resistance (virtual resistor $R_v$) is connected in series with inductor L, as shown in FIG. 9. It is assumed here that the parasitic resistance of the inductor is 0. In this case, the RC series circuit is designed so as to satisfy L/$R_v$=$C_a \cdot R_a$.

If the inductor current is monitored using the RC series circuit designed in this way, the DC factor cannot be accurately detected, but the AC factor can be correctly detected. A current mode DC/DC converter can be designed using this AC factor. It is assumed that, as the resistance value of virtual resistor $R_v$, a value which prevents the output voltage of capacitor $C_a$ from being affected by a noise is used.

Figure 10:
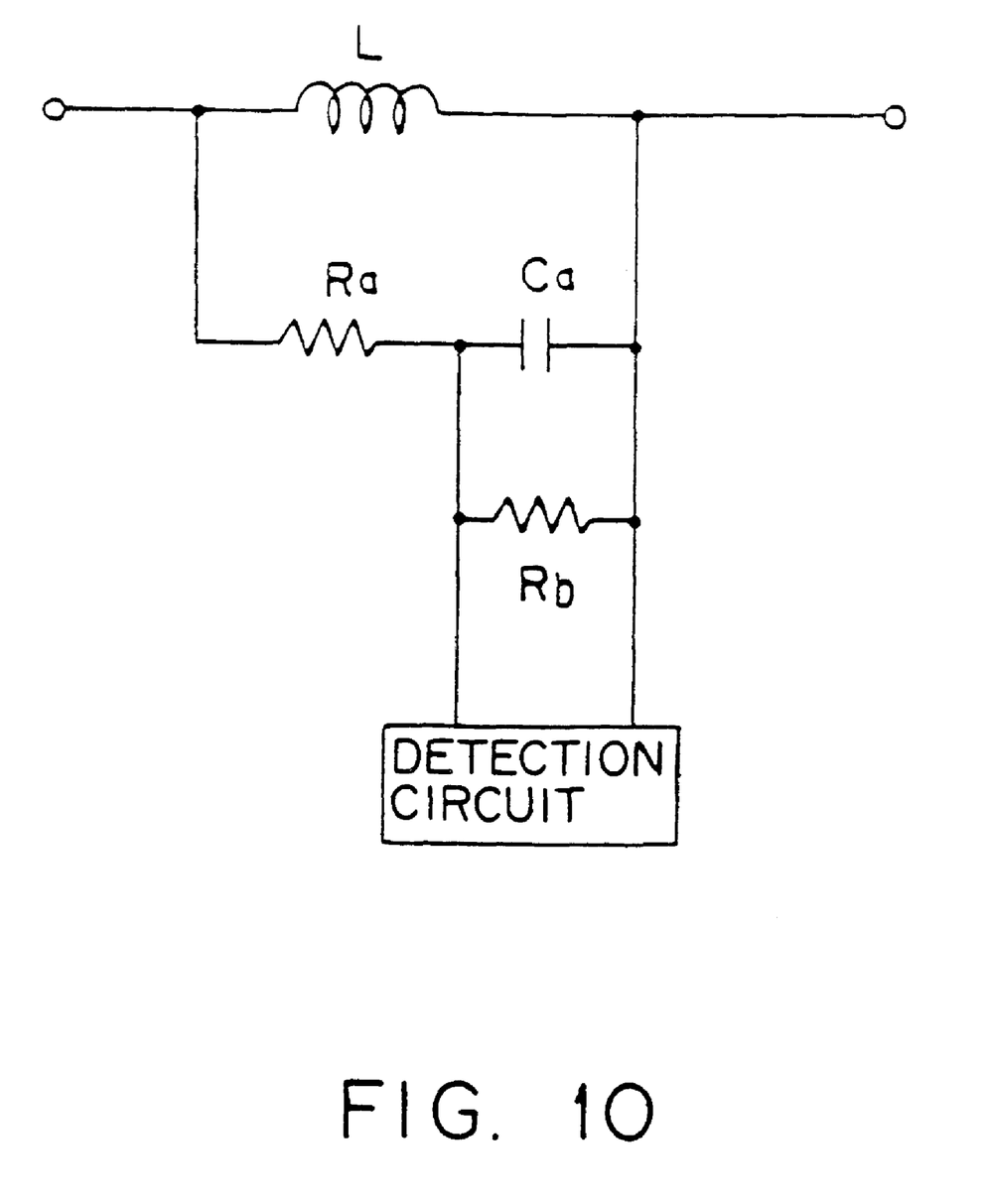
FIG. 10 shows a variation of the current detection circuit shown in FIG. 2.

FIG. 10 shows a variation of the current detection circuit shown in FIG. 2. In this circuit, a voltage divider is comprised of resistors $R_a$ and $R_b$, and a desired output voltage can be obtained by setting the resistance value of resistor $R_a$ to an appropriate value. Thus, if the parasitic resistance of the inductor is comparatively large, the detection voltage can be appropriately adjusted in the circuit shown in FIG. 10.

When the condition of equation (16) is satisfied in the circuit shown in FIG. 10, as a result, equation (17) is obtained. Therefore, the inductor current can be detected based on this detected voltage.

$$\frac{L}{R_L}(R_a // R_b) \cdot C_a = \frac{R_a \cdot R_b}{R_a + R_b} \cdot C_a \quad (16)$$

$$DETECTED VOLTAGE = \frac{R_b}{R_a + R_b} + \cdot I_L \cdot R_L \quad (17)$$

Figure 11:
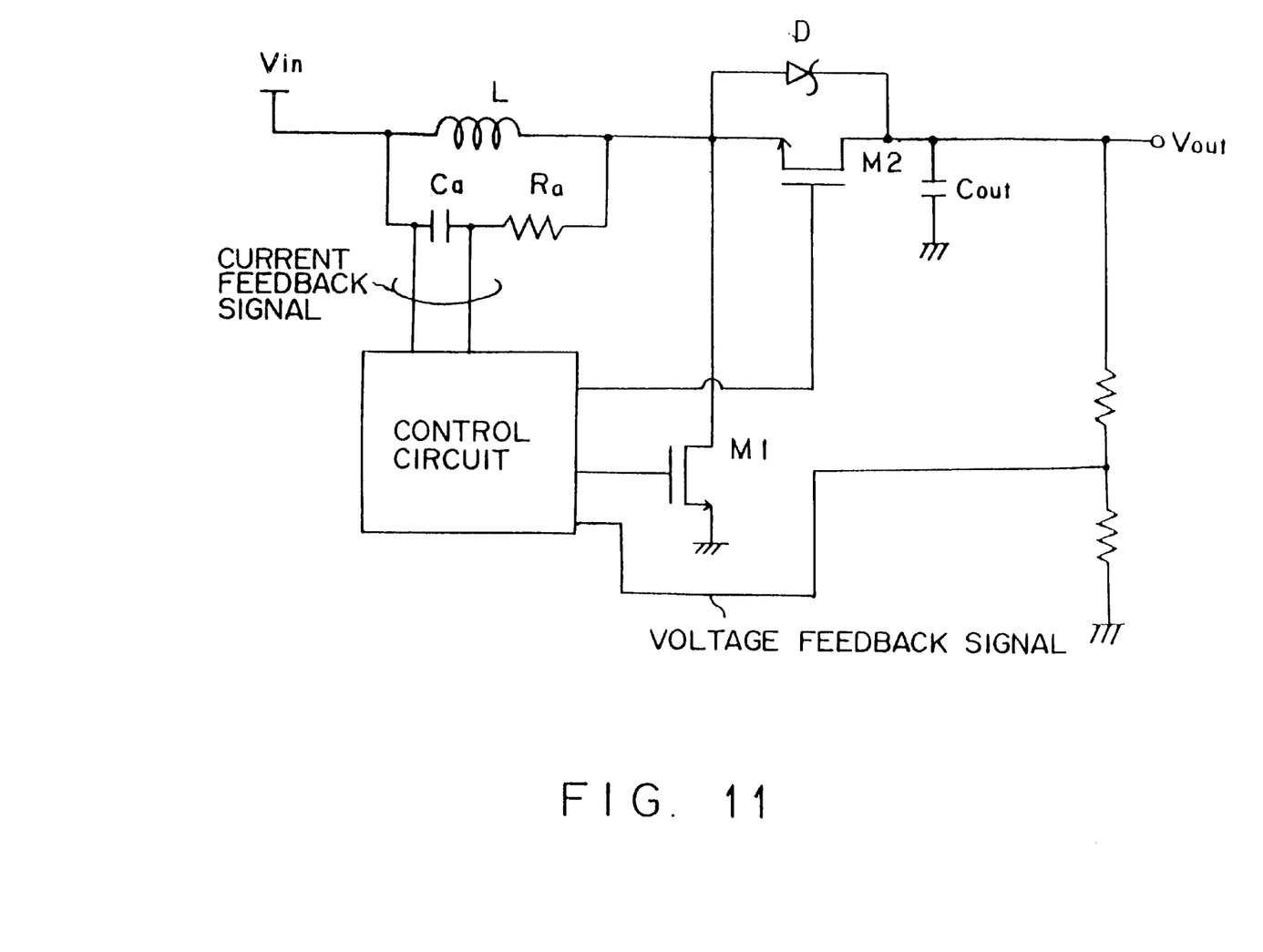
FIG. 11 shows a step-up type DC/DC converter with the current detection circuit of the present invention.
Figure 12:
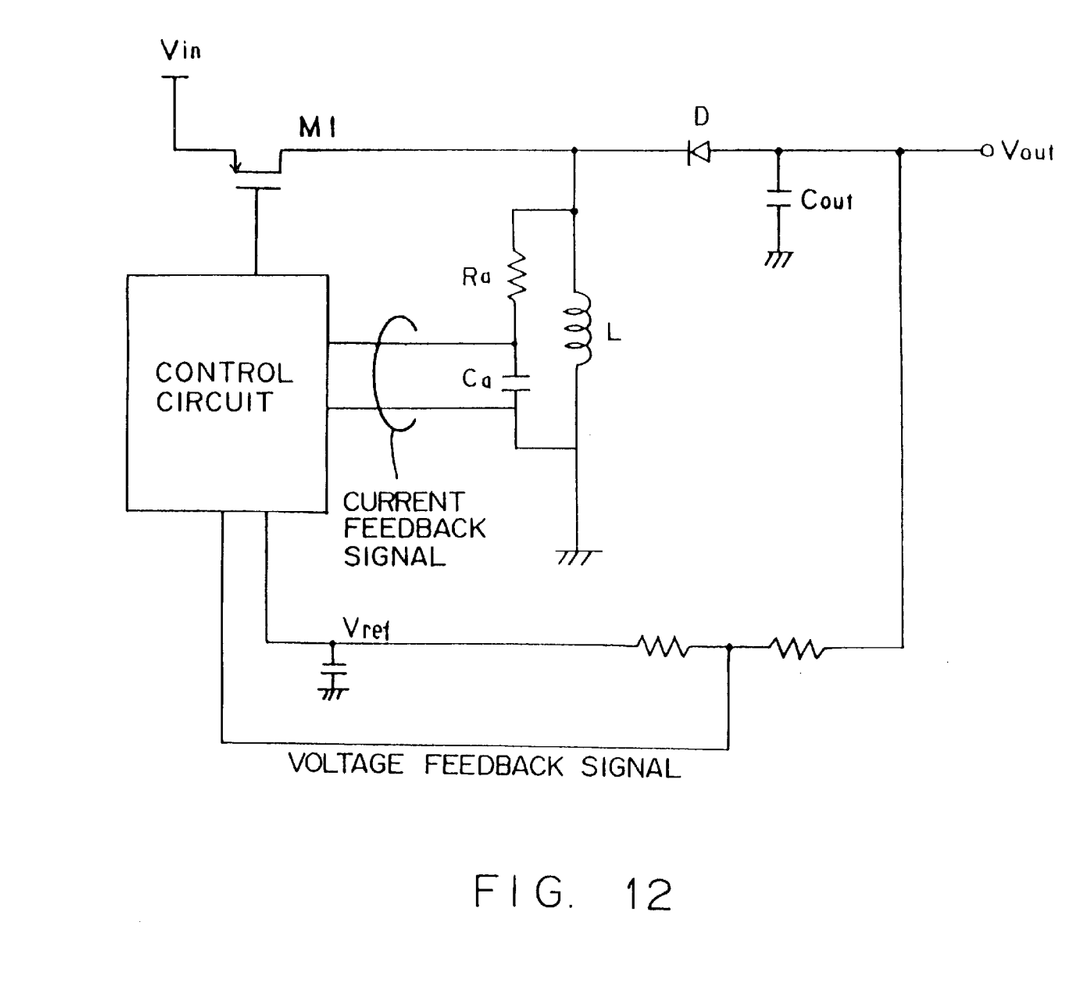
FIG. 12 shows an inverse type DC/DC converter with the current detection circuit of the present invention.

In the above-described preferred embodiments, the case where the detection circuit of the present invention is applied to a step-down type DC/DC converter has been described. However, the detection circuit has a variety of other uses. FIGS. 11 and 12 show two example cases where the current detection circuit of the present invention is applied to a step-up type DC/DC converter and an inverse type DC/DC converter, respectively.

According to the present invention, since there is no sense resistor to be provided in series with the inductor, electric power consumption for detecting the inductor current is reduced.

In a switching regulator, a spike noise which occurs at switching timing by a parasitic resistance existing in an inductor. However, in the current detection circuit of the present invention, since a circuit consisting of a capacitor and a resistor which are provided in parallel with the inductor functions as a filter, wrong operation of the circuit due to a noise can be avoided, and thereby stable circuit operation can be realized.

What is claimed is:

1. A circuit for detecting current flowing through an inductor, comprising:
   a first resistor which is connected in series with the inductor;
   a first circuit comprising a second resistor and a capacitor connected with each other in series and in parallel with the inductor and the first resistor; and
   a second circuit detecting current flowing through the inductor based on a voltage across the capacitor.

2. A DC/DC converter, comprising:
   a switch, to which DC input is applied, and which is turned on/off according to a control signal;
   an inductor connected to said switch;
   a circuit comprising a resistor and a first capacitor connected with each other in series with the resistor in parallel with a second capacitor and the resistor and first capacitor in parallel with the inductor; and
   a control unit generating a control signal to be provided to said switch based on a voltage across the first capacitor.

3. A switching voltage regulator comprising:
   an output terminal connected to a load;
   an output circuit including an inductor for storing energy and an output capacitor coupled to said output terminal which supplies a regulated voltage to said output terminal;
   a switching element coupled to said inductor so as to supply a current to said inductor in response to a switching control signal;
   a switching control circuit providing said switching control signal so as to maintain said regulated voltage to said output terminal;
   a first circuit monitoring an output voltage and generating a voltage feedback signal which indicates a target inductor current for regulating the output voltage;
   a second circuit comprising a series circuit of a resistor and a capacitor connected between both ends of said inductor, such that a voltage across said capacitor as a current feedback is generated, the second circuit further comprising an auxiliary resistor connected in series with the capacitor and generates voltage across the capacitor and the auxiliary resistor as a current feedback signal; and
   a third circuit providing said switching control signal in response to said voltage and current feedback signals.

4. A switching voltage regulator comprising:
   an output terminal connected to a load;
   an output circuit including an inductor for storing energy and an output capacitor coupled to said output terminal which supplies a regulated voltage to said output terminal;
   a switching element coupled to said inductor so as to supply a current to said inductor in response to a switching control signal;
   a switching control circuit providing said switching control signal so as to maintain said regulated voltage to said output terminal;
   a first circuit monitoring an output voltage and generating a voltage feedback signal which indicates a target inductor current for regulating the output voltage;
   a second circuit comprising a series circuit of a resistor and a capacitor connected between both ends of said inductor, such that a voltage across said capacitor as a current feedback is generated, the second circuit further comprising an auxiliary capacitor connected in parallel with the resistor and generates voltage across the capacitor as a current feedback signal; and
   a third circuit providing said switching control signal in response to said voltage and current feedback signals.

5. A switching voltage regulator comprising:
   an output terminal connected to a load;
   an output circuit including an inductor for storing energy and an auxiliary resistor connected in series with said inductor and an output capacitor coupled to said output terminal which supplies a regulated voltage to said output terminal;
   a switching element coupled to said inductor so as to supply a current to said inductor in response to a switching control signal;
   a switching control circuit providing said switching control signal so as to maintain said regulated voltage to said output terminal;
   a first circuit monitoring an output voltage and generating a voltage feedback signal which indicates a target inductor current for regulating the output voltage;
   a second circuit comprising a series circuit of a resistor and a capacitor connected in parallel with said inductor and the auxiliary resistor, such that a voltage across said capacitor as a current feedback is generated; and
   a third circuit providing said switching control signal in response to said voltage and current feedback signals.

* * * * *